United States Patent [19]

Lemin et al.

[11] 3,867,545

[45] Feb. 18, 1975

[54] CERTAIN 3-AMINO-2-(AMINOMETHYL) PROPIOPHENONES AS FUNGICIDES AND BACTERICIDES

[75] Inventors: Alan J. Lemin, Plainwell; Malcolm W. Moon; Arnolds Steinhards, both of Kalamazoo, all of Mich.

[73] Assignee: The Upjohn Company, Kalamazoo, Mich.

[22] Filed: June 8, 1970

[21] Appl. No.: 44,641

Related U.S. Application Data

[63] Continuation-in-part of Ser. No. 651,110, July 5, 1967, abandoned.

[52] U.S. Cl............. 424/325, 424/244, 424/246, 424/248, 424/250, 424/267, 424/274, 424/330, 260/239 B, 260/243 B, 260/247.5 R, 260/250 R, 260/293.63, 260/326.5 G, 260/570.5 C, 260/570.8 R, 260/570.9, 71/121

[51] Int. Cl........................... A01n 9/20, A01n 9/22

[58] Field of Search........... 260/294.7, 326.3, 570.5, 260/247.7, 268, 326.5; 424/331, 330, 232, 267, 248, 325

[56] References Cited

UNITED STATES PATENTS

| | | | |
|---|---|---|---|
| 2,282,907 | 5/1942 | ter Horst | 424/27 |
| 3,058,987 | 10/1962 | Albrecht et al. | 260/294.7 |

*Primary Examiner*—Vincent D. Turner
*Attorney, Agent, or Firm*—Carl A. Randles, Jr.; Roman Saliwanchik

[57] ABSTRACT

Certain 3-amino-2-(aminomethyl)propiophenones have been found to be active as fungicides and bactericides. The benzene ring can be unsubstituted, lower-alkyl substituted, lower-alkoxy substituted, or halogen substituted. The amino groups are variously disubstituted. The compounds are prepared by a Mannichtype reaction.

29 Claims, No Drawings

CERTAIN 3-AMINO-2-(AMINOMETHYL) PROPIOPHENONES AS FUNGICIDES AND BACTERICIDES

This application is a continuation-in-part of application Ser. No. 651,110 filed July 5, 1967, now abandoned.

SUMMARY OF THE INVENTION

This invention pertains to a new chemical process, a new method for controlling microbes and to new microbiocidal compositions. The invention is more particularly directed to a process for making 2-amino-1-(aminomethyl)ethyl aryl ketone [still more particularly 3-amino-2-(aminomethyl)propiophenone], to a new method for controlling fungi and bacteria with the 3-amino-2-(aminomethyl)propiophenone, and to new fungicidal and bactericidal compositions having 3-amino-2-(aminomethyl)propiophenone as the essential active component.

The fungicidal and bactericidal 3-amino-2-(aminomethyl)propiophenone of this invention has the formula:

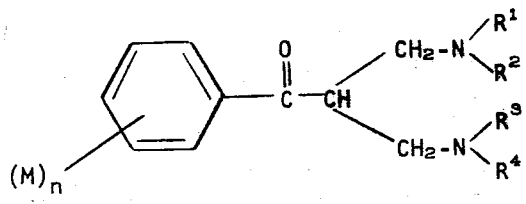

wherein M is lower-alkyl of from 1 to 4 carbon atoms, inclusive; lower-alkoxy of from 1 to 4 carbon atoms, inclusive; or halogen; $n$ is an integer 0, 1, 2, or 3; and $R^1$, $R^2$, $R^3$, and $R^4$ are substituent groups more fully described as follows Individually, $R^1$, $R^2$, $R^3$, and $R^4$ are alkyl of from 1 to 8 carbon atoms, inclusive; alkenyl of from 3 to 8 carbon atoms, inclusive; aralkyl of from 7 to 13 carbon atoms, inclusive; cycloalkyl of from 3 to 8 carbon atoms, inclusive; cycloalkenyl of from 4 to 8 carbon atoms, inclusive; and Collectively, the

group (and the

group) is a saturated heterocyclic amino group of from 5 to 7 ring atoms, inclusive, having a total of not more than 15 carbon atoms.

DETAILED DESCRIPTION OF THE INVENTION

U.S. Pat. No. 3,058,987 issued Oct. 16, 1962 describes a method for preparing "substituted diaminoisobutyrophenone" according to Formula I, above. The method described in the patent can be used to prepare all the compounds of Formula I. The general procedure is a Mannich reaction which comprises reacting an acetophenone with a secondary amine acid addition salt and paraformaldehyde in the presence of a solvent, under acid conditions, to obtain a 3-aminopropiophenone acid addition salt. The 3-aminopropiophenone acid addition salt is then mixed with a secondary amine and formaldehyde in the presence of a solvent, under alkaline conditions, in order to obtain the 3-amino-2-(aminomethyl)propiophenone.

The newly discovered process of this invention for making compounds of Formula I is advantageous, because the reaction is accomplished in one step and an organic solvent is not employed. The new one-step process is characterized by heating a methyl aryl ketone, for example, an acetophenone of the formula:

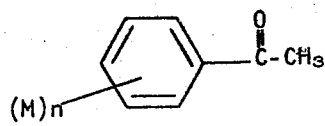

wherein M and $n$ are as defiend, with an excess of a secondary amine free base and aqueous formaldehyde. No acid catalyst is used. The desired 2-amino-1-(aminomethyl)ethyl aryl ketone, for example, the 3-amino-2-(aminomethyl)propiophenone of Formula I, is recovered from the reaction mixture by conventional methods.

Advantageously, the reaction mixture is cooled, extracted with an organic solvent, e.g., technical hexane, ether, benzene, toluene, and like solvents, and the product is recovered from the extract by evaporating or distilling the solvent, or by crystallization. Alternatively, the reaction mixture can be set aside and the water phase separated from the oily phase containing the desired product. The oily phase is washed, dried, and chilled to effect crystallization of the product.

Formula I indicates that a significant number of chemical compounds are contemplated. Many more, in fact, than those skilled in the art will readily perceive. Hence, in order to facilitate comprehension of the scope of this invention, certain descriptive terms will be defined and illustrative examples will be specified so that those skilled in the art can more readily recognize the metes and bounds of the invention.

The term "lower-alkoxy" means methoxy, ethoxy, propoxy, isopropoxy, butoxy, isobutoxy, sec-butoxy, and tert-butoxy.

The phrase "alkyl of from 1 to 8 carbon atoms, inclusive," includes for example, methyl, ethyl, propyl, butyl, pentyl, hexyl, heptyl, octyl, and isomeric forms thereof.

The phrase "alkenyl of from 3 to 8 carbon atoms, inclusive," includes for example, allyl, 1-methallyl, 2-methallyl, 2-butenyl (crotyl), 3-butenyl, 1,2-dimethallyl, 2-ethylallyl, 1-methyl-2-butenyl, 2-methyl-2-butenyl, 3-methyl-2-butenyl, 3-pentenyl, 2,3-dimethyl-2-butenyl, 1,3-dimethyl-2-butenyl, 1-ethyl-2-butenyl, 4-methyl-2-pentenyl, 2-ethyl-2-pentenyl, 4,4-dimethyl-2-pentenyl, 2-heptenyl, 2-octenyl, 5-octenyl, 1,4-dimethyl-4-hexenyl, and the like.

The phrase "aralkyl of from 7 to 13 carbon atoms, inclusive," includes for example, benzyl, phenethyl, 1-phenylethyl, 2-phenylpropyl, 4-phenylbutyl, 6-phenylhexyl, 5-phenyl-2-methylpentyl, benzhydryl, 1-naphthylmethyl, 2-(1-naphthyl)ethyl, 2-(2-naphthyl)ethyl, and the like.

The phrase "cycloalkyl of from 3 to 8 carbon atoms, inclusive," includes for example, cyclopropyl, 2-methylcyclopropyl, 2,2-dimethylcyclopropyl, 2,3-diethylcyclopropyl, 2-butylcyclopropyl, cyclobutyl, 2-methylcyclobutyl, 3-propylcyclobutyl, 2,3,4-trimethylcyclobutyl, cyclopentyl, 2,2-dimethylcyclopentyl, cyclohexyl, 3-methylcyclohexyl, 2,2-dimethylcyclohexyl, cycloheptyl, cyclooctyl, and the like.

The phrase "cycloalkenyl of from 4 to 8 carbon atoms, inclusive," includes for example, 2-cyclobutenyl, 3-cyclopentenyl, 3-cyclohexenyl, 2-ethyl-3-cyclohexenyl, and the like.

The phrase "saturated heterocyclic amino group of from 5 to 7 ring atoms, inclusive, having a total of not more than 15 carbon atoms, " includes for example, pyrrolidinyl, lower-alkylpyrrolidinyl, for example, 2-methylpyrrolidinyl, 3-butylpyrrolidinyl, 3-tert-butylpyrrolidinyl, and 2-isohexylpyrrolidinyl, polylower-alkylpyrrolidinyl, for example, 2,3-dimethylpyrrolidinyl, 2,2-dimethylpyrrolidinyl, 2,5-diethylpyrrolidinyl, and 2,3,5-trimethylpyrrolidinyl, piperidino, lower-alkylpiperidino, for example, 2-methylpiperidino, 3-methylpiperidino, 4-methylpiperidino, 3-isopropylpiperidino, and 4-tert-butylpiperidino, polylower-alkylpiperidino, for example, 3,4-diethylpiperidino, 2-methyl-5-ethylpiperidino, 3,5-dipentylpiperidino, 2,4,6-trimethylpiperidino, 2,3,5-triethylpiperidino, hexamethyleneimino, lower-alkylhexamethyleneimino, for example, 2-ethylhexamethyleneimino, 4-tert-butylhexamethyleneimino, and 3-heptylhexamethyleneimino, polylower-alkylhexamethyleneimino, for example, 2,4-dimethylhexamethyleneimino, 3,3-dimethylhexamethyleneimino, and 2,4,6-tripropylhexamethyleneimino, 4-lower-alkylpiperazinyl, for example, 4-methylpiperazinyl and 4-isopropylpiperazinyl, polylower-alkylpiperazinyl, for example, 2,4,5-trimethylpiperazinyl, morpholino, lower-alkylmorpholino, for example, 2-ethylmorpholino and 3-isobutylmorpholino, polylower-alkylmorpholino, for example, 2-ethyl-5-methylmorpholino and 3,3-dimethylmorpholino, thiamorpholino, lower-alkylthiamorpholino, for example, 3-methylthiamorpholino, and polylower-alkylthiamorpholino, for example, 2,3,6-trimethylthiamorpholino and 2,3,5,6-tetramethylthiamorpholino.

The foregoing specified and many other like saturated heterocyclic amino groups are contemplated as being within the scope of this invention. It will be noted that the saturated amino heterocycle can be other than cycloalkyleneimino and there can be a second hetero atom in the ring, i.e., an oxygen atom, a sulfur atom, or a second nitrogen atom as a ring member.

Accordingly, a further definition of the phrase is:

Collectively, $R^1$ and $R^2$ taken as a unit with the

atom, and $R^3$ and $R^4$ taken as a unit with the

atom are saturated heterocyclic amino groups of from 5 to 7 ring atoms, inclusive, each group having a total of not more than 15 carbon atoms, one of the ring atoms being selected from carbon, oxygen, sulfur, or a second nitrogen atom so the $R^1$–$R^2$ as a unit, and $R^3$–$R^4$ as a unit are alkylene, oxadialkylene, thiadialkylene, or N-alkylazadialkylene, respectively.

The 3-amino-2-(aminomethyl)propiophenones of Formula I and acid addition salts thereof are active against microorganisms, particularly fungi and bacteria. Hence, the compounds can be used in the novel compositions of this invention to control fungi and bacteria on organic matter such as wood, cellulosic fiber, leather, seeds, fruits, and vegetables; living plants; soil; and on animals such as fish, reptiles, birds, cattle, horses, dogs, cats, and other animals. The invention provides, therefore, a new means of controlling fungi and bacteria in general, as well as specific fungi and bacteria that are pathogenic to seeds, plants, and animals.

In particular, compounds of this invention have been found to be effective against the bean root rot fungi, *Fusarium solani f. phaseoli* and *Rhizoctonia solani*. Illustratively, an effective compound against both fungi is 3-morpholino-2-(morpholinomethyl-4'-methylpropiophenone. 3-Dimethylamino-2-[(dimethylamino)methyl]propiophenone is slightly more effective against the Fusarium, but slightly less effective against the Rhizoctonia.

Other fungi against which the compounds of this invention have been found to be active include: *Botrytis cinerea*, *Fusarium oxysporum*, *Monolinia fructicola*, *Pythium ultimum*, *Stemphyllium species*, *Verticillium alboatrum*, *Cytospora species*, *Blastomyces dermatitidis*, *Coccidioides immitis*, *Histoplasma capsulatum*, *trychophyton rubrum*, *Trichlophyton violaceum*, and *Trichophyton metagrophytes*.

The compounds of the invention are also active against bacteria, for example, *Erwinia amylovora*, *Pseudomonas phaseolicola*, and *Xanthomonas vesicatoria*. Some of the compounds have moderate herbicidal activity.

The 3-amino-2-(aminomethyl)propiophenones of Formula I can be used as fungicides and bactericides in the form of free bases or as acid addition salts. Preferred acid addition salts are the hydrochloride and dihydrochloride obtained with hydrochloric acid or anhydrous hydrogen chloride. Other representative mineral acid addition salts are the hydrobromides, the hydroiodides, the sulfates, the phosphates, the nitrates, the aresenates, the fluosilicates, the hexafluorophosphates, and the like.

Representative organic acid addition salts are the acetates, the propionates, the benzoates, the salicylates, the anthranilates, the glycolates, the succinates, the nicotinates, the tartrates, the maleates, the malates, the oxalates, the pamoates, the methanesulfonates, the dodecylbenzenesulfonates, the arsanilates, and the lactates.

Acid addition salts are also preparable using acidic phenols, (e.g., picric acid), acidic resins, and other compounds having acidic hydrogen atoms.

Some representative 3-amino-2-(aminomethyl)-propiophenones of this invention are:

3-diethylamino-2-[(diethylamino)methyl]propiophenone, 3-dimethylamino-2-[(dimethylamino)methyl]-4'-methylpropiophenone, 3-dimethylamino-2-[(dimethylamino)methyl]-4'-chloropropiophenone,
3-dimethylamino-2-[(dimethylamino)methyl]-4'-methoxypropiophenone,
3-pyrrolidino-2-(pyrrolidinomethyl)propiophenone,
3-piperidino-2-(piperidinomethyl)propiophenone,
3-morpholino-2-(morpholinomethyl)propiophenone,
3-piperidino-2-(piperidinomethyl)-4'-methoxypropiophenone,
3-morpholino-2-(morpholinomethyl)-4'-methoxypropiophenone,
3-pyrrolidino-2-(pyrrolidinomethyl)-4'-methoxypropiophenone,
3-morpholino-2-(morpholinomethyl)-4'-methylpropiophenone,
3-morpholino-2-(morpholinomethyl)-3',4'-dichloropropiophenone,
3-morpholino-2-(morpholinomethyl)-4'-chloropropiophenone,
3-(3,5-dipentylpiperidino)-2-[(3,5-dipentylpiperidino)methyl]-propiophenone,
3-(hexamethyleneimino)-2-(hexamethyleneiminomethyl)propiophenone,
3-(2-ethylhexamethyleneimino)-2-[(2-ethylhexamethyleneimino)-methyl]propiophenone,
3-(2,4-dimethylhexamethyleneimino)-2-[(2,4-dimethylhexamethyleneimino)methyl]propiophenone,
3-(2,4,6-tripropylhexamethyleneimino)-2-[(2,4,6-tripropylhexamethyleneimino)methyl]propiophenone,
3-(4-methylpiperazinyl)-2-[(4-methylpiperazinyl)methyl]propiophenone,
3-(2,4,5-trimethylpiperazinyl)-2-[(2,4,5-trimethylpiperazinyl)-methyl]propiophenone,
3-thiamorpholino-2-(thiamorpholinomethyl)propiophenone,
3-(3-methylthiamorpholino)-2-[(3-methylthiamorpholino)methyl]-propiophenone,
3-piperidino-2-(piperidinomethtyl)-3',4',5'-trimethoxypropiophenone,
3-morpholino-2-(morpholinomethyl)-3',4',5'-trimethoxypropiophenone,
3-dimethylamino-2-[(dimethylamino)methyl]-3',4',5'-trimethoxypropiophenone,
3-dimethylamino-2-[(dimethylamino)methyl]-4'-butoxy-2',5'-dimethylpropiophenone,
3-dimethylamino-2-[(dimethylamino)methyl]-5'-chloro-4'-methoxy-2'-methylpropiophenone, and
3-dimethylamino-2-[(dimethylamino)methyl]-2'-bromo-4'-methoxypropiophenone.

The 3-amino-2-(aminomethyl)propiophenones (free base compounds of Formula I and acid addition salts thereof) are formulated as fungicides and bactericides with solid and liquid carriers with or without adjuvants. The compounds can be used in pure form, but generally the interest of economy is best served by the formulations of the invention. The pure active compounds or the formulations can be applied to bacteria, fungi, objects, or a situs for preventing fungal and bacterial growths. The microbiocidal formulations of this invention include dispersions in powder and granular carriers, e.g., dusts and granules; dispersions in liquid carriers, e.g., true solutions, suspensions and emulsifiable concentrates; smokes and aerosols; emulsions, e.g., creams and ointments; and capsules and tablets.

The 3-amino-2-(aminomethyl)propiophenones can be readily formulated as dusts by grinding a mixture of the compound and a pulverulent carrier in the presence of each other. Grinding is conveniently accomplished in a ball mill, a hammer mill, or by air-blast micronization. A suitable ultimate particle size is less than 60 microns. Preferably, 95 percent of the particles are less than 50 microns, and about 75 percent are 5 to 20 microns. Dusts of that degree of comminution are conveniently free-flowing and can be applied to animals, inanimate matter, fruit trees, crop plants, and soil so as to effect thorough distribution and coverage. Dusts are particularly adapted for effectively controlling plant fungi over wide areas when applied by airplane. They are also indicated for application to the undersides of plant foliage and to the skin of hairy animals.

Representative suitable pulverulent carriers include the natural clays such as China, Georgia, Barden, attapulgus, kaolin, and bentonite clays; minerals in their natural forms as they are obtained from the earth such as talc, pyrophyllite, quartz, diatomaceous earth, fuller's earth, chalk, rock phosphates and sulfates, calcium carbonates, sulfur, silica and silicates; chemically modified minerals such as washed bentonite, precipitated calcium phosphate, precipitated calcium carbonate, precipitated calcium silicate, synthetic magnesium silicate, and colloidal silica; and organic flours such as wood, walnut shell, soybean, cottonseed, and tobacco flours, and free-flowing, hydrophobic starches.

Dusts can also be prepared by dissolving the 3-amino-2-(aminomethyl)propiophenone in a volatile solvent such as methylene chloride, mixing the solution with a pulverulent carrier and evaporating the solvent.

The proportions of pulverulent carrier and 3-amino-2-(aminomethyl)propiophenone can vary over a wide range depending upon the microbes to be controlled and the conditions of treatment. In general, dust formulations can contain up to about 90 percent (on a weight basis) of the active ingredient. Dusts having as little as 0.001 percent of the active ingredient can be used, but a generally preferred proportion is from about 0.50 percent to about 20 percent of active ingredient.

The dispersible powder formulations of this invention are prepared by incorporating a surfactant in a dust composition prepared as described above. When about 0.1 percent to about 12 percent of a surfactant is incorporated in a dust, the dispersible powder thus obtained is particularly adapted for further admixture with water for spraying on inanimate matter and products, fruit trees, field crops, soil, and livestock. The dispersible powders can be admixed with water to obtain any desired concentration of active ingredient, and the mixture can be applied in amounts sufficient to obtain predetermined rates of application and uniform distribution. With this flexibility in mind, the dispersible powders of the invention can conveniently comprise preferably about 10 percent to about 80 percent of active ingredient.

Representative surfactants useful for preparing dispersible powder formulations of this invention include alkyl sulfates and sulfonates, alkyl aryl sulfonates, sulfosuccinate esters, polyoxyethylene sulfates, polyoxyethylene-sorbitan monolaurate, alkyl aryl polyether sulfates, alkylaryl polyether alcohols, alkyl naphthalene sulfonates, alkyl quaternary ammonium salts, sulfated fatty acids and esters, sulfated fatty acid amides, glycerol mannitan laurate, polyalkylether condensates of fatty acids, lignin sulfonates, and the like. The preferred class of surfactants includes blends of sulfonated oils and polyalcohol carboxylic acid esters (Emcol H–77), blends of polyoxyethylene ethers and oil-soluble sulfonates (Emcol H–400), blends of alkyl aryl sulfonates and alkylphenoxy polyethoxy ethanols (Tritons X–151, X–161, and X–171), e.g., about equal parts of sodium kerylbenzene sulfonate and isooctylphenoxy polyethoxy ethanol containing about 12 ethoxy groups, and blends of calcium alkylaryl sulfonates and polyethoxylated vegetable oils (Agrimul $N_4S$). It will be understood, of course, that the sulfate and sulfonate surfactants suggested above will preferably be used in the form of their soluble salts, for example, their sodium salts. All of these surfactants are capable of reducing the surface tension of water to less than about 40 dynes per centimeter in concentrations of about 1 percent or less. The dispersible powder compositions can be formulated with a mixture of surfactants of the types indicated if desired.

A suitable dispersible powder formulation is obtained by blending and milling 327 lbs. of Georgia Clay, 4.5 lbs. of isooctylphenoxy polyethoxy ethanol (Triton X–100) as a wetting agent, 9 lbs. of a polymerized sodium salt of substituted benzoid long-chain sulfonic acid (Daxad 27) as a dispersing agent, and 113 lbs. of the active ingredient. The resulting formulation has the following percentage composition (parts herein are by weight unless otherwise specified):

| | |
|---|---|
| Active ingredient | 25% |
| Isooctylphenoxy polyethoxy ethanol | 1% |
| Polymerized sodium salt of substituted benzoid long-chain sulfonic acid | 2% |
| Georgia Clay | 72% |

This formulation, when dispersed in water at the rate of 10 lbs. per 100 gals., gives a spray formulation containing about 0.3 percent (3,000 ppm) active ingredient which can be applied to soil, plant growth media, or turf at the rate of 40 gals. per acre to give a total application of active ingredient of 1 lb. per acre.

If desired, dispersants such as methyl cellulose, polyvinyl alcohol, sodium ligninsulfonates, and the like can be included in the dispersible powder formulations of this invention. Adhesive or sticking agents such as vegetable oils, naturally occurring gums, casein, and others can also be included. Corrosion inhibitors such as epichlorohydrin and antifoaming agents such as stearic acid can also be included.

The granular formulations according to this invention are prepared by permeating a granular carrier with a solution of a 3-amino-2-(aminomethyl)propiophenone and then drying the granules. Suitable granular carriers include vermiculite, pyrophyllite, and attapulgite. Suitable solvents include acetone, methyl ethyl ketone, and methylene chloride. A solution of a 3-amino-2-(aminomethyl)propiophenone is sprayed on a granular carrier while the carrier is being mixed and tumbled. The granules are then dried. The granules can range in size from about 10 to about 60 mesh, preferably about 30 to about 60 mesh.

The compounds of this invention can be applied to fungi, bacteria, objects, or situs in aqueous sprays without a solid carrier. Since, however, many of the compounds themselves (particularly the free bases) are relatively insoluble in water, such compounds are preferably dissolved in a suitable inert organic solvent carrier. Advantageously, the solvent carrier is immiscible with water so that an emulsion of the solvent carrier in water can be prepared. If, for example, a water-miscible solvent carrier such as ethanol is used the solvent carrier will dissolve in the water and any excess 3-amino-2-(aminomethyl)propiophenone will be thrown out of solution. In an oil-in-water emulsion, the solvent phase is dispersed in the water phase and the dispersed phase contains the active ingredient. In this way, uniform distribution of a water insoluble active ingredient is achieved in an aqueous spray. A solvent carrier in which the compounds are highly soluble is desirable so that relatively high concentrations of active ingredient can be obtained. Sometimes, one or more solvent carriers with or without a cosolvent can be used in order to obtain concentrated solutions of the active ingredient, the main consideration being to employ a water-immiscible solvent for the active ingredient that will hold the compound in solution over the range of concentrations useful for preventing fungal and bacterial growths.

The emulsifiable concentrates of the invention are prepared, therefore, by dissolving the active ingredient and a surfactant in a substantially water–immiscible solvent carrier (i.e., a solvent carrier which is soluble in water to the extent of less than 2.5 percent by volume at temperatures of the order of 20° to 30° C.), for example, cyclohexanone, methyl propyl ketone, summer oils, ethylene dichloride, aromatic hydrocarbons such as benzene, toluene, and xylene, and high-boiling petroleum hydrocarbons such as kerosene, diesel oil, and the like. If desired, a cosolvent such as methyl ethyl ketone, acetone, isopropanol, and the like can be included with the solvent carrier in order to enhance the solubility of the active ingredient. Aqueous emulsions are then prepared by mixing with water to give any desired concentration of active ingredient. The surfactants which can be employed in the aqueous emulsions of the invention are those types noted above. Mixtures of surfactants can be employed, if desired.

Advantageously, the concentration of active ingredient in the emulsifiable concentrates can range from about 5 percent to about 50 percent by weight, preferably from about 10 percent to about 40 percent. A concentrate comprising 20 percent (by weight) of the compound dissolved in a water-immiscible solvent of the kind noted above can be admixed with an aqueous medium in the proportions of 13 ml. of concentrate with 1 gal. of medium to give a mixture containing 700 parts of active ingredient per million parts of liquid carrier. Similarly, 1 qt. of a 20 percent concentrate mixed with 40 gals. of water provides about 1,200 ppm (parts per million) of active ingredient. In the same manner, more concentrated solutions of active ingredient can be prepared.

The concentrate compositions of the invention which are intended for use in the form of aqueous dispersions or emulsions can also comprise a humectant, that is to say, an agent which will delay the drying of the composition in contact with material to which it has been applied. Suitable humectants include glycerol, diethylene glycol, solubilized lignins, such as calcium ligninsulfonate, and the like.

The rates of application to fungi, bacteria, objects, or situs will depend upon the species of microbe to be controlled, the presence or absence of desirable living organisms, temperature conditions of treatment, and the method and efficiency of application. In general, fungicidal activity is obtained when the compounds are applied at concentrations of about 10 to about 6,000 ppm, preferably at concentrations of about 100 to about 1,200 ppm.

The compositions containing 3-amino-2-(aminomethyl)propiophenone according to the invention, can be applied by conventional methods to fungi, bacteria, objects or any situs where control of fungi and bacteria is desired. For example, an area of soil or plants can be treated by spraying wettable powder suspensions, emulsions, or solutions from boom-type power sprayers or from hand-operated knapsack sprayers. Dusts can be applied by power dusters, or by hand-operated dusters. Creams and ointment formulations can be applied to skin or objects for prolonged protection against microorganisms.

EXAMPLE 1

Preparation of 3-dimethylamino-2-[(dimethylamino)methyl]propiophenone

To a mixture consisting of 120 g. (1.0 mole) acetophenone and 240 ml. 37 percent aqueous formaldehyde was added 135 g. (3.0 moles) anhydrous dimethylamine while the mixture was cooled and stirred. The reaction mixture was heated at the reflux temperature for 1.5 hrs. After cooling to about 25°C., 100 ml. water and 100 ml. technical hexane were added. [Technical hexane is a mixture of isomeric hexanes having a boiling range of 60° to 71° C. — Skellysolve B]. An aqueous lower and oily upper phase formed, and the oily upper phase was separated. It was washed with water and with saturated aqueous sodium chloride. The thus washed and dried oil was chilled to minus 10° C. The crystals that formed were collected on a filter and dried under reduced pressure. Recrystallization from 100 ml. petroleum ether gave 3-diemthylamino-2-[(dimethylamino)-methyl]propiophenone having a melting point of 55° to 57° C.

Following the same procedure but substituting diethylamine; dipropylamine; diallylamine; N-methylbenzylamine; N-methylcyclopentylamine; N-methyl-2-cyclohexenylamine; pyrrolidine; 3-tert-butylpyrrolidine; piperidine; 3,5-dipentylpiperidine; hexamethyleneimine; 2-ethylhexamethyleneimine; 2,4-dimethylhexamethyleneimine; 2,4,6-tripropylhexamethyleneimine; 4-methylpiperazine; 2,4,5-trimethylpiperazine; morpholine; thiamorpholine; and 3-methylthiamorpholine for dimethylamine, there are prepared the corresponding 3-diethylamino-2-[(diethylamino)methyl]propiophenone,
3-dipropylamino-2-[(dipropylamino)methyl]propiophenone,
3-diallylamino-2-[(diallylamino)methyl]propiophenone,
3-(N-methylbenzylamino)-2-[(N-methylbenzylamino)methyl]propiophenone,
3-(N-methylcyclopentylamino)-2-[(N-methylcyclopentylamino)methyl]propiophenone,
3-(N-methyl-2-cyclohexenylamino)-2-[(N-methyl-2-cyclohexenylamino)methyl]propiophenone,
3-pyrrolidino-2-(pyrrolidinomethyl)propiophenone,
3-(3-tert-butylpyrrolidino)-2-[(3-tert-butylpyrrolidino)-methyl]propiophenone,
3-piperidino-2-(piperidinomethyl)propiophenone,
3-(3,5-dipentylpiperidino)-2-[(3,5-dipentylpiperidino)methyl]-propiophenone,
3-hexamethyleneimino-2-(hexamethyleneiminomethyl)propiophenone,
3-(2-ethylhexamethyleneimino)-2-[(2-ethylhexamethyleneimino)-methyl]propiophenone,
3-(2,4-dimethylhexamethyleneimino)-2-[(2,4-dimethylhexamethyleneimino)methyl]propiophenone,
3-(2,4,6-tripropylhexamethyleneimino)-2-[(2,4,6-tripropylhexamethyleneimino)methyl]propiophenone,
3-(4-methylpiperazinyl)-2-[(4-methylpiperazinyl)methyl]propiophenone,
3-(2,4,5-trimethylpiperazinyl)-2-[(2,4,5-trimethylpiperazinyl)-methyl]propiophenone,
3-morpholino-2-(morpholinomethyl)propiophenone,
3-thiamorpholino-2-(thiamorpholinomethyl)propiophenone, and
3-(3-methylthiamorpholino)-2-[(3-methylthiamorpholino)methyl]-propiophenone.

EXAMPLE 2

Activity against *Pythium ultimum*

A 694 ppm (parts per million) aqueous solution of 3-dimethylamino-2-[(dimethylamino)methyl]propiophenone (Compound A) was prepared by dissolving 222 mg. of the compound in a mixture consisting of 50 ml. acetone and 1 ml. dimethylformamide and mixing the solution with 269 ml. water containing 0.5 ml. polyoxyethylene sorbitan monolaurate. A similar aqueous solution was prepared with 3-diethylamino-2-[(diethylamino)methyl]-propiophenone (Compound B). In the case of each aqueous solution, the following comparative test was carried out.

Twelve 4-inch square pots of soil were thoroughly infested with *Pythium ultimum*. Six of these were seeded with 16 seeds each of peas, and six were seeded with 16 seeds each of cotton. The aqueous solution of the compound was sprayed directly on the seeds and the covering soil at the rate of 16 pounds per acre. Twelve corresponding pots which had been infested with *Pythium ultimum* were seeded in the same manner, but not sprayed for a control. Another series of 12 pots containing steamed soil (not inoculated) were seeded but not sprayed.

After incubation in a greenhouse for 17 days, the total number of emergent seedlings and healthy plants in each series of replicates was determined. The results were as follows:

Table 1

| | Peas Emergence | Post-emergence dampening-off | Cotton Emergence | Post-emergence dampening-off |
|---|---|---|---|---|
| Untreated | 2 | 0 | 7 | 2 |
| Steamed soil | 89 | 0 | 83 | 0 |
| Compound A | 63 | 0 | 57 | 8 |
| Compound B | 46 | 0 | 77 | 5 |

The foregoing data show that 3-dimethylamino-2-[(dimethylamino)methyl]propiophenone and 3-diethylamino-2-[(diethylamino)- methyl]propiophenone are effective against *Pythium ultimum* and can be used to protect seeds and seedlings from dampening-off.

EXAMPLE 3

Activity against *Fusarium solanum*

Following the procedure of Example 2, but substituting the fungus *Fusarium solanum* for the fungus *Pythium ultimum*, substituting beans for peas, and using 8 lbs. per acre rate, the following results were obtained:

Table 11

|  | Germination | Beans Disease Evaluation* | Germination | Cotton Disease Evaluation* |
| --- | --- | --- | --- | --- |
| Untreated | 62 | 4.0 | — | — |
| Steamed soil | 83 | 0.5 | 83 | 0.7 |
| Compound A | 79 | 1.6 | 91 | 1.9 |
| Compound B | 72 | 1.8 | 86 | 1.8 |

* The plants were evaluated according to the severity of disease appearing on the roots and hypocotyl. 0 = no disease, and 5 = most severe disease.

The foregoing data show that 3-dimethylamino-2-[(dimethylamino)methyl]propiophenone and 3-diethylamino-2-[(diethylamino)methyl]propiophenone are effective against *Fusarium solanum* and can be used to protect seeds and seedlings from disease.

EXAMPLE 4

Activity against *Venturia inaequalis*

A solution of 1,000 ppm of 3-dimethylamino-2-[(dimethylamino)methyl]propiophenone prepared as in Example 2, above, was sprayed on apple trees severely infected with the apple scab fungus *Venturia inaequalis*. Samples of leaves were collected and stored, during the winter, in specially adapted polyethylene containers. In the spring, the leaves were examined under a microscope at 40 diameters magnification and the number of active perithecia determined. The observations showed that 3-dimethylamino-2-[(diemthylamino)methyl]propiophenone significantly reduced the incidence of infective perithecia, and that the compound is effective against the perfect stage of *Venturia inaequalis*.

EXAMPLE 5

A dispersible powder concentrate having the following percentage composition:

| | |
| --- | --- |
| 3-dimethylamino-2-[(dimethylamino)methyl]-propiophenone | 45.8% |
| Polymerized sodium salt of substituted benzoid long-chain sulfonic acid (Daxad 27) | 9.2% |
| Kaolinite | 45.0% | was prepared by mixing 250 gm. 3-diemthylamino-2-[(dimethylamino)methyl]propiophenone, 50 gm. of a polymerized sodium salt of substituted benzoid long-chain sulfonic acid (Daxad 27), and 245 gm. of kaolinite. The mixture was milled to a particle size averaging 5 to 30 microns. It was suspended in 10 gals. of water, giving an aqueous spray containing about 6,500 parts per million of active ingredient.

EXAMPLE 6

A fine granular formulation having the following percentage composition:

| | |
| --- | --- |
| 3-diethylamino-2-[(diethylamino)methyl]-propiophenone | 3.7% |
| Vermiculite (30/60 mesh) | 96.3% | was prepared by spraying a solution of 220 gm. of 3-diethylamino-2-[(diethylamino)methyl]propiophenone in 1,000 ml. of methylene chloride on 5,780 gm. of vermiculite (30 to 60 mesh) while the vermiculite was being tumbled and stirred so as to assure even distribution. The methylene chloride was then evaporated, leaving the 3-diethylamino-2-[(diethylamino)methyl]-propiophenone adsorbed on the vermiculite, and the vermiculite was pulverized.

EXAMPLE 7

An emulsifiable concentrate having the following percentage composition:

| | |
| --- | --- |
| 3-dipropylamino-2-[(dipropylamino)methyl]-propiophenone | 15.0% |
| Technical alkyl naphthalene boiling at 238° to 293°C. (Velsicol AR50) | 19.7% |
| Xylene | 17.4% |
| Isopropanol | 17.4% |
| Ethylene dichloride | 25.4% |
| Blend of alkyl aryl sulfonates and alkylphenoxy polyethoxy ethanols (Triton X-151) | 5.1% | was prepared by mixing 15.0 lbs. of 3-dipropylamino-2-[(dipropylamino)methyl]propiophenone, 19.7 lbs. of Velsicol AR50, 17.4 lbs. of xylene, 17.4 lbs. of isopropanol, 25.4 lbs. of ethylene chloride, and 5.1 lbs. of Triton X-151.

6.67 lbs. of the concentrate mixed with 10 gals. of water gave a spray emulsion containing 11,000 ppm of 3-dipropylamino-2-[(dipropylamino)methyl]propiophenone.

EXAMPLE 8

An emulsifiable concentrate having the following percentage composition:

| | |
| --- | --- |
| 3-morpholino-2-(morpholinomethyl)-propiophenone | 40.0% |
| Technical alkyl naphthalene boiling at 238° to 293° C. (Velsicol AR50) | 13.7% |
| Xylene | 12.3% |
| Isopropanol | 11.3% |
| Ethylene dichloride | 17.7% |
| Blend of alkyl aryl sulfonates and alkylphenoxy polyethoxy ethanols (Triton X-151) | 5.0% | was prepared by mixing 40.0 lbs. of 3-morpholino-2-(morpholinomethyl)propiophenone, 13.7 lbs. of Velsicol AR50, 12.3 lbs. of xylene, 11.3 lbs. of isopropanol, 17.7 lbs. of ethylene dichloride, and 5.0 lbs. of Triton X-151.

1.67 lbs. of the concentrate mixed with 10 gals. of water gave a spray emulsion containing 8,000 ppm of 3-morpholino-2-(morpholinomethyl)propiophenone.

EXAMPLE 9

A wettable powder concentrate having the following percentage composition:

| | |
| --- | --- |
| 3-dimethylamino-2-[(dimethylamino)methyl]-propiophenone | 50% |
| Kaolinite clay (finely divided) | 46% |

-Continued

| | |
|---|---|
| Sodium salt of condensed mononaphthalene sulfonic acid (Lomar D) | 4% | was prepared by mixing 50 gm. of 3-dimethylamino-2-[(dimethylamino)methyl]propiophenone, 46 gm. of the kaolinite clay, and 4 gm. of Lomar D. The mixture was milled to an average particle size of 5 to 30 microns.

EXAMPLE 10

A granular formulation having the following percentage composition:

3-diethylamino-2-[(diethylamino)-methyl]propiophenone
Pyrophyllite (30/60 mesh)

was prepared by dissolving 1.0 lb. of 3-diethylamino-2-[(diethylamino)methyl]propiophenone in 10.0 l. of ethylene dichloride and spraying the solution on 99.0 lbs. of pyrophyllite. The granules were dried and then packaged for use.

In accordance with the foregoing description, the words "control", "controlling", and "controlled" are used in the accepted sense of killing, inhibiting the growth and propagation of, and otherwise suppressing the growth and propagation of "fungi and bacteria that are pathogenic to seeds, plants, and animals." Further as used herein, the words "control", "controlling," and "controlled" do not mean improvement, enhancement, or stimulation of the growth and propagation of bacteria and fungi. Moreover, as indicated at page 9, line 6 and the Examples, the preparation and application of "pure active compounds" is contemplated as a preferred embodiment of the invention, but this indicated preference does not preclude the contemplation of the various other embodiments of the invention that include mixtures of pure active compounds, e.g., free bases, acid addition salts, and mixtures of one or more free base with one or more acid addition salt.

The active free base compounds of the invention have been described by the general Formula I on page 1 and definition of variables M, $n$, $R^1$, $R^2$, $R^3$, and $R^4$ on pages 1 and 2. Acid addition salts are described at page 7. Accordingly, an alternative inclusive description of the active compounds of this invention is as follows:

Compounds selected from the group consisting of free bases of the formula:

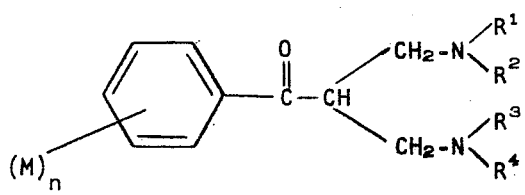

wherein M is lower-alkyl of from 1 to 4 carbon atoms, inclusive; lower-alkoxy of from 1 to 4 carbon atoms, inclusive; or halogen; $n$ is an integer 0, 1, 2, or 3; and $R^1$, $R^2$, $R^3$, and $R^4$ are substituent groups more fully described as follows:

Individually, $R^1$, $R^2$, $R^3$, and $R^4$ are alkyl of from 1 to 8 carbon atoms, inclusive; alkenyl of from 3 to 8 carbon atoms, inclusive; aralkyl of from 7 to 13 carbon atoms, inclusive; cycloakyl of from 3 to 8 carbon atoms, inclusive; cycloalkenyl of from 4 to 8 carbon atoms, inclusive; and Collectively, the

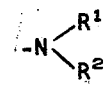

group (and the

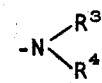

group) is a saturated heterocyclic amino group of from 5 to 7 ring atoms, inclusive; having a total of not more than 15 carbon atoms,
and acid addition salts thereof.

The foregoing inclusive, and the previous separate descriptions of the free bases and acid addition salts are believed to adequately, unambiguously, and accurately define the active agent subject matter of this invention.

We claim:

1. A method of controlling bacteria and fungi, which comprises applying to bacteria, fungi, or a situs an effective amount of a compound selected from the group consisting of free bases of the formula:

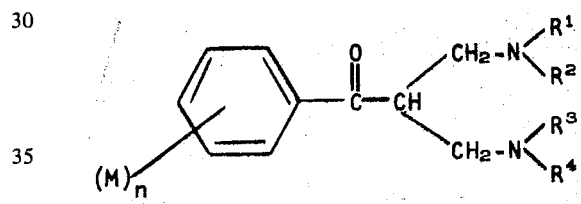

wherein M is lower-alkyl of from 1 to 4 carbon atoms, inclusive; lower-alkoxy of from 1 to 4 carbon atoms, inclusive, or halogen; $n$ is an integer 0, 1, 2, or 3; and $R^1$, $R^2$, $R^3$, and $R^4$ are substituent groups more fully described as follows:

Individually, $R^1$, $R^2$, $R^3$, and $R^4$ are alkyl of from 1 to 8 carbon atoms, inclusive; alkenyl of from 3 to 8 carbon atoms, inclusive; aralkyl of from 7 to 13 carbon atoms, inclusive; cycloalkyl of from 3 to 8 carbon atoms, inclusive; cycloalkenyl of from 4 to 8 carbon atoms, inclusive; and Collectively, the

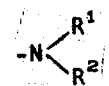

group and (and the

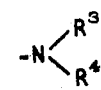

group) is a saturated heterocyclic amino group of from 5 to 7 ring atoms, inclusive; having a total of not more than 15 carbon atoms,
and acid addition salts thereof.

2. The method according to claim 1 wherein $R^1$, $R^2$, $R^3$, and $R^4$ are alkyl.

3. The method according to claim 2 wherein alkyl is methyl and $n$ is 0.

4. The method according to claim 2 wherein alkyl is ethyl and $n$ is 0.

5. A method of controlling apple scab fungus, *Venturia inaequalis*, which comprises applying to the fungus, an area of soil, or an apple tree an effective amount of a compound selected from the group consisting of free bases of the formula:

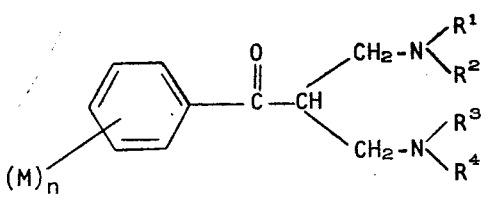

wherein M is lower-alkyl of from 1 to 4 carbon atoms, inclusive; lower-alkoxy of from 1 to 4 carbon atoms, inclusive, or halogen; $n$ is an integer 0, 1, 2, or 3; and $R^1$, $R^2$, $R^3$, and $R^4$ are substituent groups more fully described as follows:

Individually, $R^1$, $R^2$, $R^3$, and $R^4$ are alkyl of from 1 to 8 carbon atoms, inclusive; alkenyl of from 3 to 8 carbon atoms, inclusive; aralkyl of from 7 to 13 carbon atoms, inclusive; cycloalkyl of from 3 to 8 carbon atoms, inclusive; cycloalkenyl of from 4 to 8 carbon atoms, inclusive; and Collectively, the

group (and the

group) is a saturated heterocyclic amino group of from 5 to 7 ring atoms, inclusvie; having a total of not more than 15 carbon atoms, and acid addition salts thereof.

6. The method according to claim 5 wherein $R^1$, $R^2$, $R^3$, and $R^4$ are alkyl.

7. The method according to claim 6 wherein alkyl is methyl and $n$ is 0.

8. The method according to claim 6 wherein alkyl is ethyl and $n$ is 0.

9. A composition effective against fungi and bacteria, comprising a dispersible carrier, a surfactant, and as the essential active ingredient a compound selected from the group consisting of free bases of the formula:

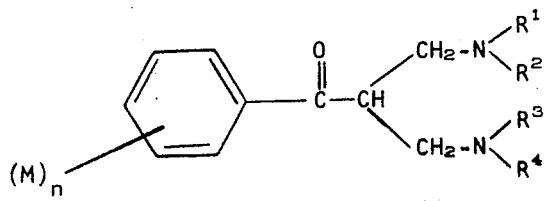

wherein M is lower-alkyl of from 1 to 4 carbon atoms, inclusive, lower-alkoxy of from 1 to 4 carbon atoms, inclusive, or halogen; $n$ is an integer 0, 1, 2, or 3; and $R^1$, $R^2$, $R^3$, and $R^4$ are substituent groups more fully described as follows:

Individually, $R^1$, $R^2$, $R^3$, and $R^4$ are alkyl of from 1 to 8 carbon atoms, inclusive; alkenyl of from 3 to 8 carbon atoms, inclusive; aralkyl of from 7 to 13 carbon atoms, inclusive; cycloalkyl of from 3 to 8 carbon atoms, inclusive; cycloalkenyl of from 4 to 8 carbon atoms, inclusive; and Collectively, the

group (and the

group) is a saturated heterocyclic amino group of from 5 7 ring atoms, inclusive; having a total of not more than 15 carbon atoms, and acid addition salts thereof.

10. The composition according to claim 9 wherein the dispersible carrier is a liquid carrier.

11. The composition according to claim 10 wherein the carrier is aqueous and the groups $R^1$, $R^2$, $R^3$, and $R^4$ are alkyl.

12. The composition according to claim 11 wherein alkyl is methyl and $n$ is 0.

13. The composition according to claim 11 wherein alkyl is ethyl and $n$ is 0.

14. The composition according to claim 9 wherein the dispersible carrier is a pulverulent carrier.

15. A process of controlling bacteria and fungi which comprises applying to bacteria, fungi, or a situs an effective amount of a compound selected from the group consisting of free bases of the formula:

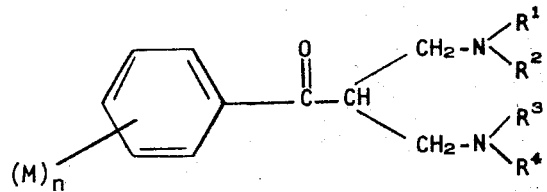

wherein M is lower-alkyl of from 1 to 4 carbon atoms, inclusive; lower-alkoxy of from 1 to 4 carbon atoms, inclusive; or halogen; $n$ is an integer 0, 1, 2, or 3; and $R^1$, $R^2$, $R^3$, and $R^4$ are substituent groups as follows:

Individually, $R^1$, $R^2$, $R^3$, and $R^4$ are alkyl of from 1 to 8 carbon atoms, inclusive; aralkyl of from 7 to 13 carbon atoms, inclusive; cycloalkyl of from 3 to 8 carbon atoms, inclusive; cycloalkenyl of from 4 to 8 carbon atoms, inclusive; and Collectively. $R^1$ and $R^2$ taken as a unit with the

atom, and R³ and R⁴ taken as a unit with the

atom are saturated heterocyclic amino groups of from 5 to 7 ring atoms, inclusive, each group having a total of not more than 15 carbon atoms, one of the ring atoms being selected from carbon, oxygen, sulfur, or a second nitrogen atom so the R¹-R² as a unit, and R³-R⁴ as a unit are alkylene, oxadialkylene, thiadialkylene, or N-alkylazadialkylene, respectively,
and acid addition salts thereof.

16. The method according to claim 15 wherein R¹, R², R³, and R⁴ are alkyl.

17. The method according to claim 16 wherein alkyl is methyl and $n$ is 0.

18. The method according to claim 16 wherein alkyl is ethyl and $n$ is 0.

19. The method of controlling apple scab fungus, Venturia inaequalis, which comprises applying to the fungus, an area of soil, or an apple tree, an effective amount of a compound selected from the group consisting of free bases of the formula:

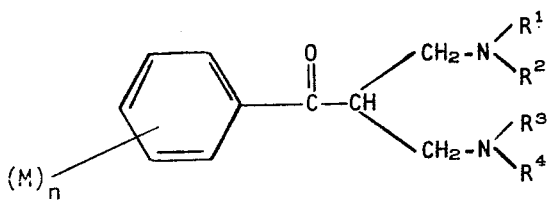

wherein M is lower-alkyl of from 1 to 4 carbon atoms, inclusive; lower-alkoxy of from 1 to 4 carbon atoms, inclusive; or halogen; $n$ is an integer 0, 1, 2, or 3; and R¹, R², R³, and R⁴ are substituent groups as follows:
Individually, R¹, R², R³, and R⁴ are alkyl of from 1 to 8 carbon atoms, inclusive; alkenyl of from 3 to 8 carbon atoms, inclusive; aralkyl of from 7 to 13 carbon atoms, inclusive; cycloalkyl of from 3 to 8 carbon atoms, inclusive; cycloalkenyl of from 4 to 8 carbon atoms, inclusive; and
Collectively, R¹ and R² taken as a unit with the

atom, and R³ and R⁴ taken as a unit with the

atom are saturated heterocyclic amino groups of from 5 to 7 ring atoms, inclusive, each group having a total of not more than 15 carbon atoms, one of the ring atoms, being selected from carbon, oxygen, sulfur, or a second nitrogen atom so that R¹-R² as a unit, and R³-R⁴ as a unit are alkylene, oxadialkylene, thiadialkylene, or N-alkylazadialkylene, respectively,
and acid addition salts thereof.

20. The method according to claim 19 wherein R¹, R², R³, and R⁴ are alkyl.

21. The method according to claim 20 wherein alkyl is methyl and $n$ is 0.

22. The method according to claim 20 wherein alkyl is ethyl and $n$ is 0.

23. A composition effective against bacteria and fungi comprising a solid pulverulent dispersible carrier, 0.1 to 12 percent of a surfactant, and as the essential active ingredient a compound selected from the group consisting of free bases of the formula:

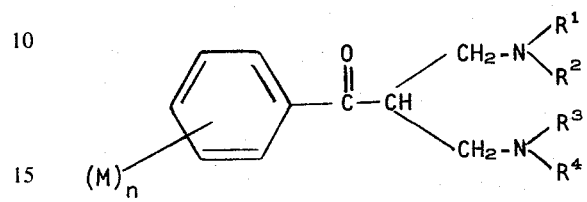

wherein M is lower-alkyl of from 1 to 4 carbon atoms, inclusive; lower-alkoxy of from 1 to 4 carbon atoms, inclusive; or halogen; $n$ is an integer 0, 1, 2, or 3; and R¹, R², R³, and R⁴ are substituent groups as follows:
Individually, R¹, R², R³, and R⁴ are alkyl of from 1 to 8 carbon atoms, inclusive; alkenyl of from 3 to 8 carbon atoms, inclusive; aralkyl of from 7 to 13 carbon atoms, inclusive; cycloalkyl of from 3 to 8 carbon atoms, inclusive; cycloalkenyl of from 4 to 8 carbon atoms, inclusive; and
Collectively, R¹ and R² taken as a unit with the

atom, and R³ and R⁴ taken as a unit with the

atom are saturated heterocyclic amino groups of from 5 to 7 ring atoms, inclusive; each group having a total of not more than 15 carbon atoms, one of the ring atoms being selected from carbon, oxygen, sulfur, or a second nitrogen atom so that R¹-R² as a unit, and R³-R⁴ as a unit are alkylene, oxadialkylene, thiadialkylene, or N-alkylazadialkylene, respectively,
and acid addition salts thereof.

24. The composition according to claim 23 wherein R¹, R², R³, and R⁴ are alkyl.

25. The composition according to claim 24 wherein alkyl is methyl and $n$ is 0.

26. The composition according to claim 24 wherein alkyl is ethyl and $n$ is 0.

27. A fungicidal composition comprising vermiculite and the adsorbate compound selected from the group consisting of free bases of the formula:

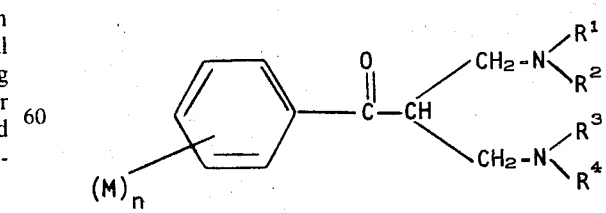

wherein M is lower-alkyl of from 1 to 4 carbon atoms, inclusive; lower-alkoxy of from 1 to 4 carbon atoms, inclusive, or halogen; $n$ is an integer 0, 1, 2, or 3; and $R^1$, $R^2$, $R^3$, and $R^4$ are substituent groups more fully described as follows:

Individually, $R^1$, $R^2$, $R^3$, and $R^4$ are alkyl of from 1 to 8 carbon atoms, inclusive; alkenyl of from 3 to 8 carbon atoms, inclusive; aralkyl of from 7 to 13 carbon atoms, inclusive; cycloalkyl of from 3 to 8 carbon atoms, inclusive; cycloalkenyl of from 4 to 8 carbon atoms, inclusive; and Collectively, the

group (and the $$-N\begin{matrix}R^3\\R^4\end{matrix}$$

group) is a saturated heterocyclic amino group of from 5 to 7 ring atoms, inclusive; having a total of not more than 15 carbon atoms, and acid addition salts thereof.

28. A fungicidal composition comprising pulverized vermiculite and the adsorbate compound according to claim 27, 3-diethylamino-2-[(diethylamino)methyl]-propiophenone.

29. A fungicidal composition comprising pulverized vermiculite and the adsorbate compound according to claim 27, 3-dimethylamino-2-[(dimethylamino)methyl]propiophenone.

* * * * *